July 29, 1941.   J. M. UNK   2,251,085
SHORT ELECTROMAGNETIC WAVE OSCILLATORY CIRCUIT
Filed March 9, 1940

INVENTOR.
JACOB MARINUS UNK
BY
ATTORNEY.

Patented July 29, 1941

2,251,085

UNITED STATES PATENT OFFICE 2,251,085

SHORT ELECTROMAGNETIC WAVE OSCILLATORY CIRCUIT

Jacob Marinus Unk, Eindhoven, Netherlands, assignor to Radio Corporation of America, a corporation of Delaware Application March 9, 1940, Serial No. 323,073
In the Netherlands March 23, 1939

5 Claims. (Cl. 178—44)

This invention relates to an oscillatory circuit for short electromagnetic waves which may be used with advantage for stabilizing oscillations of very high frequency set up by a generator.

Oscillatory circuits constituted by two concentric conductors interconnected electrically at at least one end are known in which, in order that it may be possible for the natural frequency of the oscillatory circuit to be adjusted, at least one of the conductors or a part thereof is adapted to move relative to the remaining part of the oscillatory circuit.

In the well known form of construction the end of the inner concentric conductor which is not connected electrically to the other conductor is closed by a plate which is adapted to move relative to that end of the outer one of the concentric conductors which is arranged opposite thereto and also closed by a plate. The plate which closes the inner conductor is electrically connected to the remaining part of the inner conductor by a corrugated thin-walled metal tube which constitutes an extension of the inner conductor. An extensible tube piece of this kind can, however, be manufactured with difficulty only and is consequently expensive. Besides, in view of the distortion occurring upon adjustment of the frequency of the oscillatory circuit use should be made of a comparatively thin-walled tube piece with the result that the oscillatory circuit becomes very sensitive to mechanical vibrations.

The invention has for its object to provide a particular construction of oscillatory circuits of the above-mentioned type with the avoidance of the said disadvantages.

According to the invention, the parts of the oscillatory circuit which are adapted to move relative to one another are interconnected electrically by a corrugater diaphragm located in a plane normal or substantially normal to the axial direction of the concentric conductors.

In a highly convenient form of construction of the oscillatory circuit according to the invention the inner conductor is carried upon a rod arranged within this conductor, said rod being journaled so as to be adapted to slide in a support secured to the outer conductor and the diaphragm being electrically connected to one end of the inner conductor and in addition to the corresponding end of the outer conductor.

Figure 1:
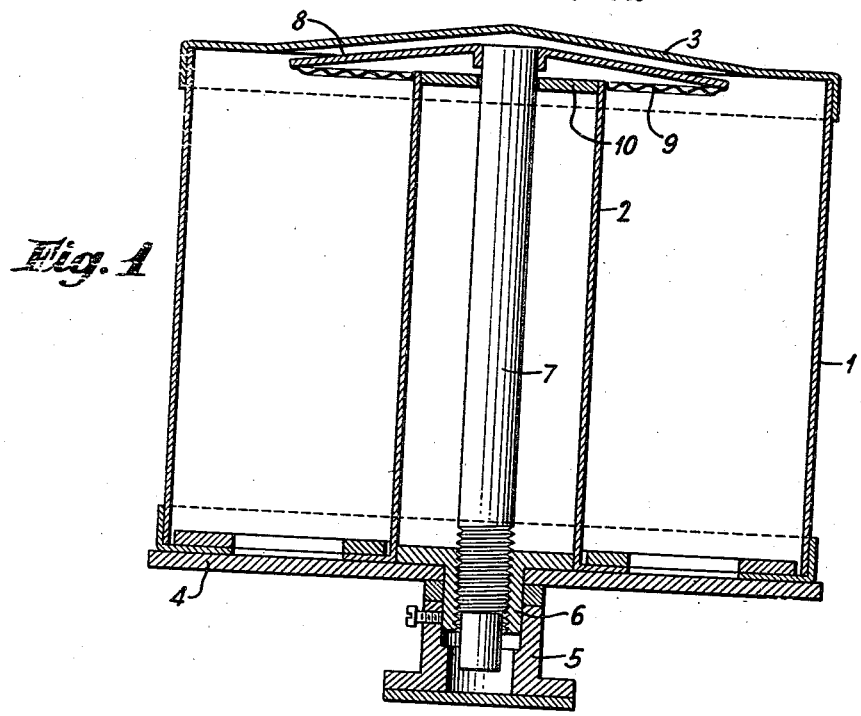
Figure 2:
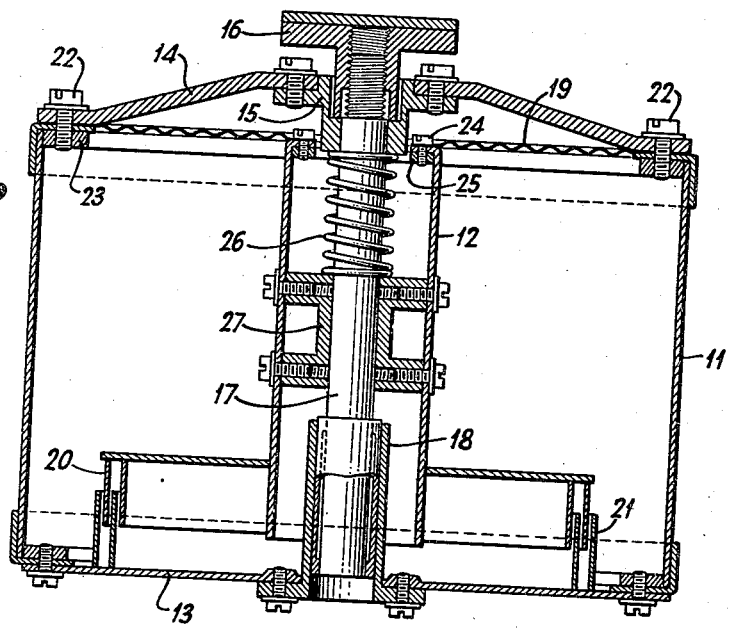

In order that the invention may be clearly understood and readily carried into effect, it will now be described more fully with reference to the accompanying drawing wherein Figs. 1 and 2 show two forms of construction of the oscillatory circuit according to the invention.

The oscillatory circuit shown in Fig. 1 comprises substantially two tubular conductors 1 and 2 are arranged so as to be concentric with each other. At one end, the outer conductor 1 is closed by a partially conical plate 3. At the other end the outer conductor is closed by a metal plate 4 and electrically connected to the corresponding end of the inner conductor 2. Centrally of the plate 4 a sleeve 6 secured to an adjusting knob 5 is journaled so as to be adapted to rotate. Upon rotation of the adjusting knob a threaded rod 7 is displaced in the axial direction. A conical plate 8 is secured to that end of the rod 7 which is adjacent the plate 3. The edge of the plate 8 is electrically connected to the outer edge of a plane corrugated metal diaphragm 9, for example by soldering. The inner edge of the annular diaphragm is connected, preferably also by soldering, to the free end of the inner conductor 2 which is closed by a plate 10. The plate 10 has formed in it a recess which closely embraces the rod 7 and which ensures a support of the rod 7 at this end.

The conical plate 8 together with the conical part of the plate 3 forms a condenser whose capacity can be altered by variation of the relative spacing of the plates. Upon rotation of the adjusting knob the rod 7 and the conical plate 8 fixed thereto are displaced and the natural frequency of the oscillatory circuit is altered. The rod 7 is preferably made wholly or partly of a material having such coefficient of expansion that in the case of temperature fluctuations the variation of the rod in length brings about at least in part a compensation for the normal variation of the natural frequency with temperature.

As may be seen from the construction described, a given displacement of the rod 7 brings about a distortion of the diaphragm 9 which, particularly in a radial direction, is but very slight. This has the advantage that a comparatively rigid diaphragm can be used and the sensitiveness of the oscillatory circuit to mechanical vibrations is not impaired by the diaphragm.

In the construction shown in Fig. 2, the outer conductor 11 of the two concentric conductors 11 and 12 is closed at one end by a plane plate 13 and at the other end by a conical plate 14 which serves as a support for a rod 17. The support 14 has secured to it a sleeve 15 in the bore of which is fitted an adjusting knob 16. The bore of the adjusting knob is threaded similarly to that part of the rod 17 which is arranged inside. Upon rotation of the adjusting knob 16 the rod 17 is displaced axially. The rod 17 is centered at the end adjacent the plate 13 by means of a journal box 18 secured in the plate 13 with the result that lateral displacements of this end of the rod 17 are prevented. The rod 17 has secured to it a sleeve 27 provided with two flanges and carrying the inner conductor 12 of the oscillatory circuit. With a view to increasing the capacity between the plate 13 and the end of the inner conductor adjacent this plate spiral, concentric condenser elctrodes 20 and 21 respectively are provided. The capacity of the condenser thus formed can be adjusted by axial displacement of the inner conductor 12 relative to the other conductor 11 so that a very efficient control of the natural frequency of the oscillatory circuit is obtained. A spring 26 is provided for the purpose of giving removal of any axial displacement of the adjusting knob and of the injurious effects of any amount of play of the thread by means of which the rod 17 is shifted.

Whereas, as described hereinbefore, the inner conductor 12 is secured to the outer conductor 11 by means of the support 14, the conductors 11 and 12 are interconnected electrically by a diaphragm 19 located in a plane normal to the axial direction. The outer edge of the diaphragm is gripped between the bent-over edge of the outer conductor 11 and the edge of the support 14 by means of screws 22 and a ring 23, whereas the central part of the diaphragm, which part comprises a recess, is clamped or soldered, by means of screws 24 and a ring 25, against the end of the inner conductor 12 which is also bent inwardly.

It has been found that particularly the oscillatory circuit shown in Fig. 2 is extremely insensitive to mechanical vibrations.

What is claimed is:

1. An oscillatory circuit for short electromagnetic waves comprising two or more concentric conductors interconnected electrically at at least one end, at least one of the conductors or part thereof being adapted to move axiallly relative to the remaining part of the oscillatory circuit, and a corrugated diaphragm having its corrugations located in a plane normal or substantially normal to the axial direction of said concentric conductors interconnecting electrically the parts adapted to move relative to one another.

2. An oscillatory circuit for short electromagnetic waves comprising two or more concentric conductors interconnected electrically at at least one end, the innermost conductor being adapted to move axially relative to the remaining part of the oscillatory circuit, a corrugated diaphragm located in a plane normal or substantially normal to the axial direction of said concentric conductors electrically inter-connecting the parts adapted to move relative to one another, said innermost conductor being carried upon a rod-arranged within this conductor, said rod being journaled so as to be adapted to slide in a support secured to the outermost conductor, whereas the diaphragm is electrically connected to one end of the innermost conductor and in addition to the corresponding end of the outermost conductor and forms part of the surface of the oscillatory circuit which carries current when the latter is in use.

3. An oscillatory circuit in accordance with claim 2, wherein that end of the rod which is remote from the support is journaled in a plate closing that end of the outer conductor which is remote from the support.

4. An oscillatory circuit comprising a pair of coaxially arranged conductors, means for mechanically and electrically connecting said conductors together at one end, means for capacitively coupling said conductors together at the other end including a first metallic plate connected to the outer conductor of said pair and a second metallic plate spaced from said first plate and connected to the inner conductor of said pair through a corrugated electrically conducting member, said corrugated member being arranged substantially at right angles to the length of said coaxial conductors and connecting the edges of said second plate to the adjacent end of said inner conductor.

5. An oscillatory circuit in accordance with claim 4, characterized in this that said second plate bulges outwardly with respect to the adjacent end of said inner conductor, there being a rod supporting the center of said second plate from the remote end of said inner conductor.

JACOB MARINUS UNK.